United States Patent [19]

Larkins

[11] Patent Number: 5,303,933
[45] Date of Patent: Apr. 19, 1994

[54] SHUT-OFF SEAL FOR A ROTATABLE SHAFT

[75] Inventor: David J. Larkins, Brampton, Canada

[73] Assignee: Robbins & Myers, Inc., Dayton, Ohio

[21] Appl. No.: 911,278

[22] Filed: Jul. 9, 1992

[51] Int. Cl.⁵ .................................... F16J 15/34
[52] U.S. Cl. ............................ 277/9; 277/9.5; 277/38
[58] Field of Search .................. 277/9, 9.5, 59, 65, 277/38, 85; 366/285, 286, 331

[56] References Cited

U.S. PATENT DOCUMENTS

| | | |
|---|---|---|
| 2,390,602 | 12/1945 | Maier . |
| 4,106,778 | 8/1978 | Cormack et al. . |
| 4,419,015 | 12/1983 | Liddiard . |
| 4,511,255 | 4/1985 | Saucier . |
| 4,556,222 | 12/1985 | Lewis et al. ................. 277/9 |
| 4,765,631 | 8/1988 | Köhnen et al. . |
| 4,795,572 | 1/1989 | LaValley ................. 277/9 X |
| 4,878,677 | 11/1989 | Larkins et al. . |
| 5,102,151 | 4/1992 | Stolzenfeld ............. 277/9 X |
| 5,224,762 | 7/1993 | Levenstein ............. 277/9 X |

*Primary Examiner*—Thomas B. Will
*Assistant Examiner*—Scott W. Cummings
*Attorney, Agent, or Firm*—Biebel & French

[57] ABSTRACT

A shut-off seal for a rotatable shaft penetrating a fluid-holding tank through an opening below the fluid surface. The shut-off seal has a collar secured to the shaft inside the tank and a positionable annular shut-off ring which may be moved into engagement with the collar. The invention enables leakage-free shutdown for servicing an associated rotary seal without moving the rotary seal axially along the shaft.

3 Claims, 3 Drawing Sheets

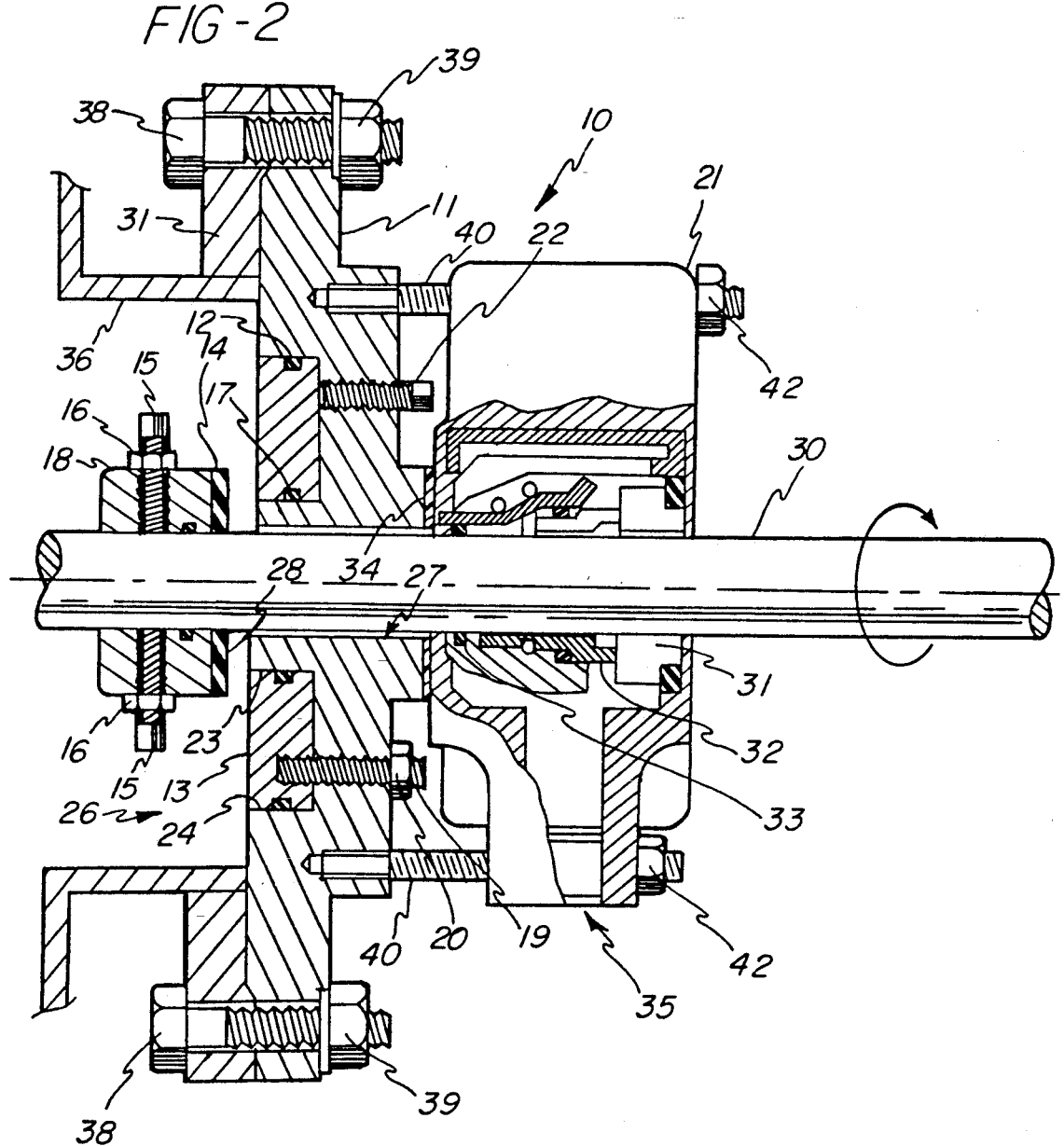

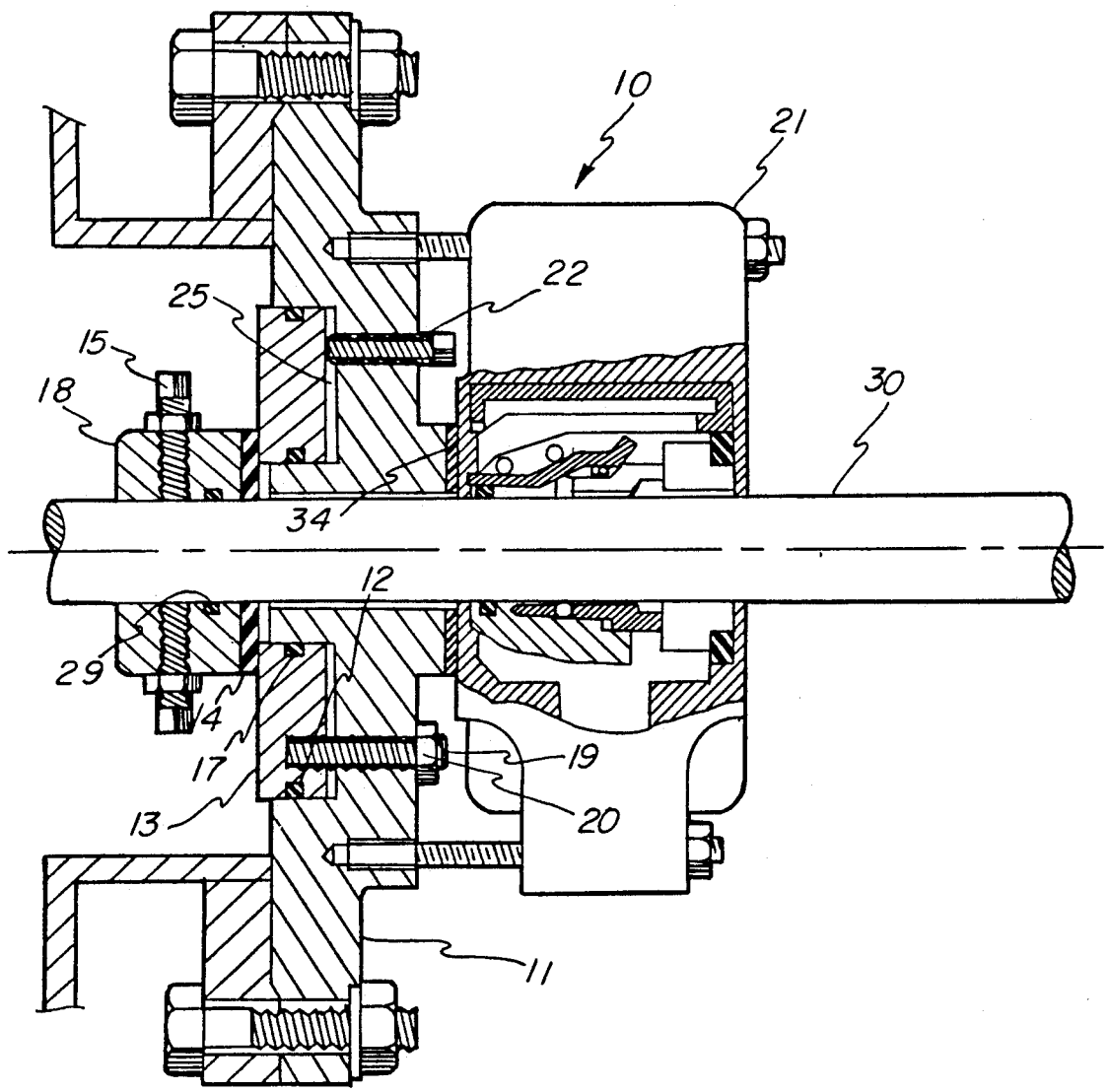

SHUT-OFF SEAL FOR A ROTATABLE SHAFT

BACKGROUND OF THE INVENTION

This invention relates to a shut-off seal for a rotatable shaft which enters a fluid holding tank through an opening below the fluid surface. The invention has particular application to large mixing tanks and the like equipped with an agitator driven by a rotatable shaft. The drive means for the shaft ordinarily is located outside the tank at a relatively low level, so that arrangements must be made for sealing the tank at the point of shaft entry. Rotary seals for such purposes are well-known, but they are subject to wear and must be replaced from time-to-time. In order to service the seal it is necessary either to empty the tank or to provide a shut-off seal for preventing fluid leakage during the servicing operation.

Larkins et al., U.S. Pat. No. 4,878,677, discloses a shut-off seal comprising a moveable housing which receives a stuffing box. The stuffing box seals the shaft against liquid leakage during normal operational use. When the stuffing box seals become warn, the housing is moved into engagement with a collar which is secured to the shaft adjacent the inside surface of the tank. A shut-off seal is created between the surface of the collar and a surface of the housing. This necessarily requires transverse movement of the stuffing box along the axial direction of the shaft. Once a shut-off seal has been achieved, then the stuffing box may be serviced as required.

In many applications it is desirable to employ a mechanical seal for sealing of the shaft during normal operation. Such seals are well-known and are able to seal a rotating shaft quite effectively. Unfortunately, conventional mechanical seals cannot be moved transversely along the shaft to accommodate shut-off sealing as taught by U.S. Patent 4,878,677. A need therefore exists for a shut-off seal which may be operated from a point outside a fluid holding tank without moving the working rotary seal.

SUMMARY OF THE INVENTION

This invention provides a shut-off seal for a rotatable shaft which may be brought into sealing engagement without disturbing the rotary seal which normally prevents fluid leakage. This is accomplished by means of a flange which has an outwardly facing sealing surface for sealing engagement with the rotary seal means and an inwardly facing annular channel displaced annularly outward of an aperture which is penetrated by the shaft. An annular shut-off ring is movably received within the annular channel and is sealed against first and second annularly displaced walls of the annular channel. A collar similar to the collar of U.S. Pat. No. 4,878,677 is secured to the rotatable shaft inwardly of the flange. Positioning means, which may be a jack screw arrangement, reaches through the flange for engagement with the shut-off ring. Shut-off sealing is accomplished by operating the positioning means to move the shut-off ring into sealing engagement with the collar.

BRIEF DESCRIPTION OF THE DRAWING

FIG. 2 is a vertical cross-section of the shut-off seal in its deactivated state.

FIG. 3 is a vertical cross-section of the shut-off seal in its activated state.

DESCRIPTION OF THE PREFERRED EMBODIMENT

Figure 1:
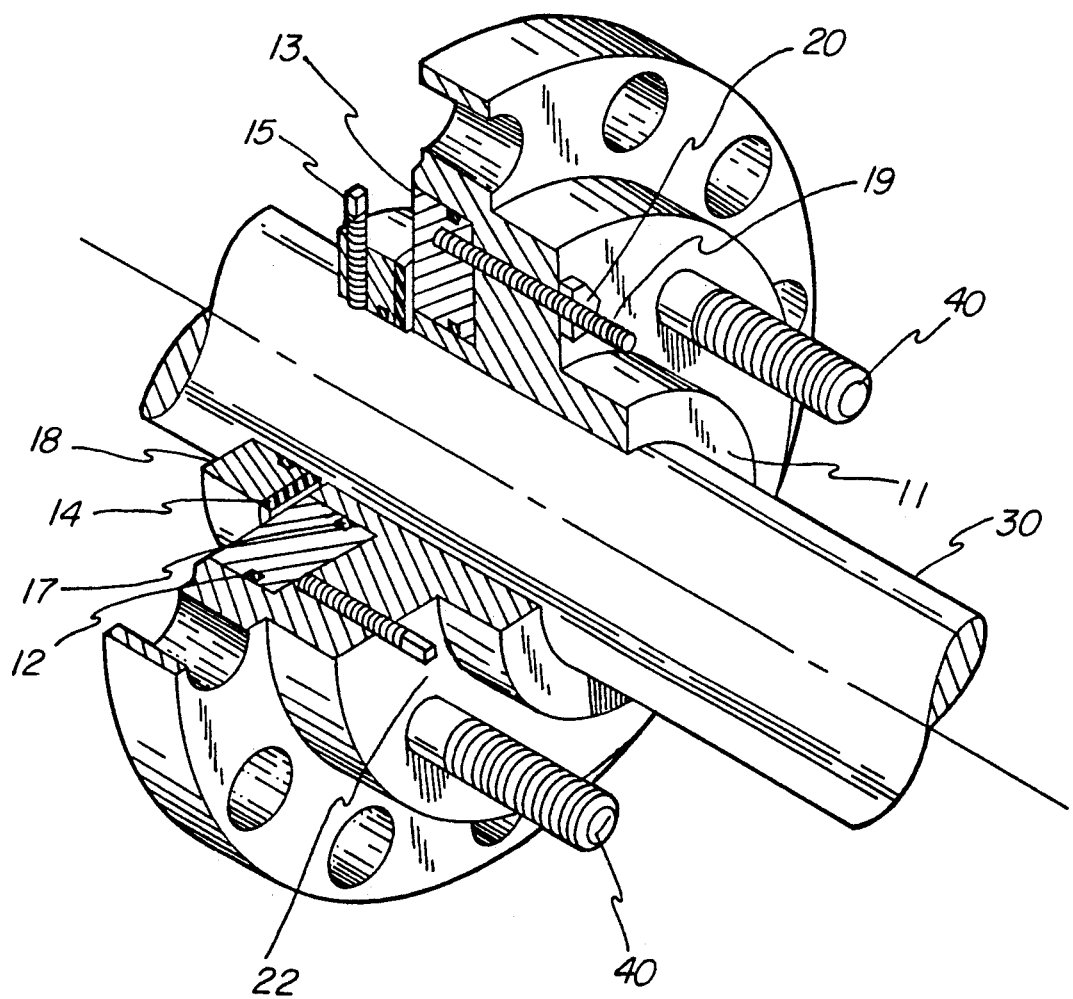
FIG. 1 is a perspective view of a shut-off seal for a rotatable shaft.

Referring first to FIG. 1, there is illustrated a seal assembly 10 comprising a flange 11. Flange 11 is mounted adjacent the lower end of a mixing tank or the like for covering an opening 26, as illustrated in FIG. 2. Opening 26 is defined by a side entry nozzle 36 which may be configured as taught by Larkins, U.S. Pat. No. 4,878,677. A circumferential end flange 37 may be welded around side entry nozzle 36. Flange 11 may be mounted against circumferential flange 37 by means of a series of bolts 38 and nuts 39. Rotatable shaft 30 penetrates flange 11 through an aperture 27. Flange 11 has an outwardly facing sealing face 41, against which a gasket 34 is positioned. Rotary seal means, such as a mechanical seal 21 may be mounted on shaft 30 in sealing engagement against gasket 34.

Flange 11 is provided with an inwardly facing annular channel 25 (See FIG. 3), displaced annularly outward from aperture 27. Channel 25 has a first wall 23 positioned annularly outward from aperture 27 and a second wall 24 positioned annularly outward of first wall 23. An annular shut-off ring 13 is configured for fluid tight positioning within channel 25. Thus, shut-off ring 13 is fitted with a first O-ring 17 which engages first wall 23 of channel 25 and a second O-ring 12 which engages second wall 24 of channel 25.

The seal assembly 10 also comprises collar means including a collar 18 fixed on shaft 30 by a pair of set screws 15,15 and a pair of lock nuts 16,16. The collar means also has a seal ring 14 sealed against collar 18. Seal ring 14 has a shut-off surface 28 displaced from shut-off ring 13 and extending parallel thereto for a distance reaching annularly beyond first wall 23 of channel 25. Shut-off ring 13 may be positioned against shut-off surface 28, as illustrated in FIG. 3. When shut-off ring 13 is so positioned, O-rings 12,13 and seal ring 14 cooperatively provide a fluid tight seal, thereby relieving mechanical seal 21 that function.

Inward movement of shut-off ring 13 may be produced by rotational adjustment of three jack screws 22. Jack screws 22 are rotated until shut-off ring 13 comes into the desired sealing contact with seal ring 14. Flange 11 is penetrated by three studs 19 which are secured in shut-off ring 13. Studs 19 are fitted with nuts 20 which must be loosened in order to accommodate inward movement of shut-off ring 13.

Mechanical seal 21 is secured against gasket 34 by means of a series of studs 40 and nuts 42. After shut-off ring 13 has been moved into engagement with seal ring 14, nuts 42 may be loosened, and rotary seal 21 may be disassembled for service.

After servicing has been completed and seal 21 has been reassembled, nuts 42 again are tightened. Thereafter, shut-off ring 13 is deactivated. Deactivation of shut-off ring 13 is accomplished by tightening nuts 20 to pull shut-off ring 13 out of engagement with seal ring 14. Jack screws 22 must be reversely operated to provide clearance for the reverse movement of shut-off ring 13.

As noted above, rotary seal 21 may be of conventional design and may comprise packing rings or mechanical sealing elements. By way of illustration, rotary seal 21 may comprise a stator 31, a rotor 32 and an O-ring 33. In such an arrangement a mechanical seal is formed between the opposing faces of stator 31 and rotor 32. Seal 21 alternatively may comprise an arrangement of the type disclosed in White U.S. Pat. No. 4,501,429 or other sealing elements of known configuration.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. For a rotatable shaft penetrating a fluid holding tank through an opening below the surface of a fluid maintained within said tank and being provided with rotary seal means external of said tank, a shut-off seal comprising:

flange means for covering said opening; said flange means being provided with a circular aperture for passage of said shaft, a sealing surface facing outwardly with respect to said fluid holding tank for sealing against said rotary seal means, and an annular channel facing inwardly with respect to said fluid holding tank having a first wall which is displaced radially outward of said aperture and a second wall which is displaced radially outward of said first wall, an annular shut-off ring configured for reception by said annular channel, channel sealing means for sealing said shut-off ring against said first and second walls, collar means mounted upon said shaft at a point inside said tank; said collar means being sealed against said shaft and being provided with a shut-off surface displaced from said shut-off ring and extending parallel thereto for a distance reaching annularly beyond said first wall, and positioning means for selectively moving said shut-off ring between a first position clear of said collar means and a second position in sealing engagement with said shut-off surface.

2. A shut-off seal according to claim 1 wherein said positioning means comprises a plurality of jack screws for selectively moving said shut-off ring from said first position to said second position and a plurality of flange studs for selectively moving said shut-off ring from said second position to said first position, said jack screws and said flange studs extending through said flange means for engaging said shut-off ring.

3. A shut-off seal according to claim 2 wherein said collar means comprises an annular collar, set screw means for securing said collar to said shaft, and an annular seal ring secured to said collar and facing said shut-off ring.

* * * * *